United States Patent
Egashira

(10) Patent No.: US 6,890,658 B2
(45) Date of Patent: May 10, 2005

(54) TRANSPARENT RESIN-COATED STAINLESS STEEL ARTICLE

(75) Inventor: Ken Egashira, Kanagawa (JP)

(73) Assignee: 3M Innovative Properties Company, St. Paul, MN (US)

(*) Notice: Subject to any disclaimer, the term of this patent is extended or adjusted under 35 U.S.C. 154(b) by 92 days.

(21) Appl. No.: 10/381,297

(22) PCT Filed: Sep. 28, 2001

(86) PCT No.: PCT/US01/30660

§ 371 (c)(1),
(2), (4) Date: Jul. 28, 2003

(87) PCT Pub. No.: WO02/27046

PCT Pub. Date: Apr. 4, 2002

(65) Prior Publication Data

US 2004/0028937 A1 Feb. 12, 2004

(30) Foreign Application Priority Data

Sep. 29, 2000 (JP) ........................................ 2000-300791

(51) Int. Cl.$^7$ ............................................. B32B 15/08
(52) U.S. Cl. ................ 428/425.5; 428/626; 428/425.8; 427/409
(58) Field of Search .............................. 428/626, 425.8, 428/425.5; 427/409

(56) References Cited

U.S. PATENT DOCUMENTS

| | | | |
|---|---|---|---|
| 5,037,681 A | 8/1991 | Yada et al. | |
| 5,139,601 A | 8/1992 | Holmes-Farley et al. | |
| 5,209,983 A | 5/1993 | Case et al. | |

FOREIGN PATENT DOCUMENTS

| | | | |
|---|---|---|---|
| EP | 0 231 001 | 8/1987 | ............ B05D/7/14 |
| JP | 62-174387 | 7/1987 | ........... C23C/22/50 |
| JP | 63-260965 | 10/1988 | ............ C09D/3/78 |
| JP | 2-234859 | 9/1990 | ........... B60R/13/04 |
| JP | 08290525 | 11/1996 | |

Primary Examiner—James J. Seidleck
Assistant Examiner—Melanie Bissett
(74) Attorney, Agent, or Firm—Jean A. Lown

(57) ABSTRACT

A stainless steel article which has a transparent and uniform resin coating thereon, which can utilize the surface appearance of the stainless steel used as a substrate, which shows a high adhesive strength between the resin coating and stainless steel as a ground, which can be easily produced with a small number of steps, and which is particularly useful as an automotive exterior article. The stainless steel article comprises a stainless steel substrate and a transparent resin film with which at least one surface of the substrate is coated, the resin film comprising a transparent synthetic resin base and a transparent heat-sensitive adhesive layer formed on the synthetic resin base on the side of the stainless steel substrate, and the resin film being bonded to the stainless steel substrate through a silane coupling agent.

7 Claims, No Drawings

TRANSPARENT RESIN-COATED STAINLESS STEEL ARTICLE

TECHNICAL FIELD

The present invention relates to a stainless steel article, in particular to a transparent resin-coated stainless steel article excellent in water resistance, light resistance and the like, and capable of manifesting the features of the ground of stainless steel without modification. The transparent resin-coated stainless steel article of the present invention can be advantageously used as, for example, an automotive exterior part etc.

BACKGROUND OF THE INVENTION

Stainless steel sheets have heretofore been excellent in durability and formability, and have a metallic appearance. Accordingly, they have been widely used as exterior materials in various technological fields.

For example, in the field of the automobile industry, a stainless steel sheet is used as an exterior part in a molding subsequent to roll forming and in a pillar subsequent to press forming, because the exterior part made of a stainless steel sheet can give an artistic appearance in which the unique brightness and feeling of metallic mass that the stainless steel sheet has are utilized by coating the steel sheet with a transparent resin.

However, it is difficult to readily form a transparent resin coating in a satisfactory form on the surface of such a stainless steel sheet exterior part. For example, in the method of coating a stainless steel sheet with a molten resin by extrusion, a resin having a specific composition suited to the extrusion conditions must be used. Moreover, the steel sheet surface must be thickly coated with the resin. It is therefore impossible to thinly coat an exterior part having a complicated shape with the resin.

It has also been proposed to form a resin coating by painting in a molten resin. For example, Japanese Unexamined Patent Publication (Kokai) No. 62-174387 discloses a method of forming a fluoro resin coating excellent in weathering resistance, resistance to dirt and slipperiness on the surface of a stainless steel. In order to improve the adhesive strength of the fluoro resin with the stainless steel, the method of forming a resin coating comprises coating the surface of the stainless steel with a silane coupling agent having an amino group, in a coating amount of 1 to 500 g/m$^2$. Moreover, Japanese Unexamined Patent Publication (Kokai) No. 63-260965 discloses a transparent resin composition for stainless steel in which 0.1 to 5% by weight of a terminal epoxy group-containing silane coupling agent and 0.5 to 10 parts by weight of an oxalanilide ultraviolet absorber are added to 100 parts by weight of a resin containing 60 to 99% by weight of a solid component of a solvent-soluble fluoro resin having a hydroxyl value of 20 to 250 and 1 to 40% by weight of a solid component of a curing agent.

However, in the resin coating method in which a silane coupling agent is used, as described above, expected action and effect cannot be obtained so long as a silane coupling agent having a special composition is not employed. Moreover, in these methods, forming a resin coating having a uniform thickness is difficult, and articles having the shape of final products must be coated with a resin and baked individually. As a result, productivity and efficiency are reduced.

Furthermore, coating the surface of a stainless steel sheet with a resin film in place of extruding a molten resin or forming a resin coating has also been proposed (for example, refer to Japanese Unexamined Patent Publication (Kokai) No. 2-234859). The method of using a resin film can realize the following: easy formation of a coating having a uniform thickness; provision of a product having an appearance of high quality; and continuous lamination of a resin film to a flat sheet of a stainless steel and subsequent forming such as roll forming and press forming. Accordingly, the method also has the advantage of increased productivity. However, the method of laminating a resin film to a stainless steel sheet using a pressure-sensitive adhesive and a heat-sensitive adhesive restricts the properties (such as adhesive strength) of the adhesive to be used. The method therefore cannot be advantageously used for specific applications. For example, a stainless steel article used as an automotive exterior part must pass various endurance tests. However, the adhesive subsequent to the test can no longer show an adhesive strength comparable to that prior to the test. Accordingly, the stainless steel article with a resin film cannot be used as an automotive exterior part without further processing.

In order to supplement such a low adhesive strength between the stainless steel article and the resin film, there is a common method comprising continuously coating the surface of the stainless steel article with an acrylic primer and baking the primer in the processing steps (of Japanese Unexamined Patent Publication (Kokai) No. 2-234859, if necessary). However, since the acrylic primer has a poor light resistance, the primer tends to peel off at the interface between the stainless steel and the primer when the primer is exposed to light over a long period of time. In order to avoid such problems produced by the acrylic primer, a transparent resin film excellent in light transmission cannot be used on a stainless steel article. Presently, stainless steel articles are coated by extrusion of polyvinyl chloride (PVC) or a colored resin film having a toning level sufficient to substantially prevent transmission of light. Thus it would be an advantage to provide a stainless steel as an automotive exterior article on which a transparent decorative film is formed.

SUMMARY OF THE INVENTION

The present invention is a stainless steel article which has a transparent and uniform resin coating formed thereon. The article utilizes the surface appearance of the stainless steel substrate, and possesses a high adhesive strength between the resin coating and stainless steel. This article can be produced with a limited number of steps, and is particularly useful as an automotive exterior article.

According to the present invention, a stainless steel substrate is coated with a resin film on at least one surface of the substrate. The resin film includes a synthetic resin base and a heat-sensitive adhesive layer formed on the synthetic resin base on the side of the stainless steel substrate. The resin film is bonded to the stainless steel substrate through a silane coupling agent.

DETAILED DESCRIPTION

The transparent resin-coated stainless steel article according to the present invention comprises a stainless steel substrate and a transparent resin film with which at least one surface of the substrate is coated. The stainless steel article may optionally have additional layers or films for improving the properties and appearance.

There is no specific limitation on the stainless steel substrate in the resin-coated stainless steel article of the present invention. The substrate can be formed to have various shapes from an optionally selected and commercially available stainless steel. In general, the substrate can be formed from an austenitic, ferritic or martensitic stainless steel containing at least about 10% by weight of chromium for the following reasons. When the chromium content in the stainless steel is large, the steel can be readily formed to have a predetermined shape. Specific types of suitable stainless steels include SUS 430 and SUS 304. Foreign materials such as dust are usually removed from the surface of such a stainless steel. The stainless steel may then be subjected to conventional treatment such as surface treatment. Examples of the surface treatment include cleaning the stainless steel surface with alcohol for removing fats and oils and passivation thereof for preventing rusting. The stainless steel may optionally be subjected to chemical conversion treatment. Moreover, the stainless steel can usually be obtained as a sheet having a thickness selected from a wide thickness range.

A transparent resin film is then continuously laminated to the steel sheet according to the present invention, and the steel sheet is subjected to an various forming procedures such as roll forming or press forming to give an article having a desired shape. As explained below, the resin-coated stainless steel article of the present invention is useful for an automotive exterior part, such as a molding or a pillar.

The transparent resin film with which the stainless steel substrate as explained above is generally coated with a transparent synthetic resin base and a transparent heat-sensitive adhesive layer formed on the stainless steel substrate side of the base.

The transparent resin film can be formed from any of the various transparent synthetic resin materials to have a freely selected thickness so long as the film does not exert adverse effects on the appearance etc. of the stainless steel substrate used as an underlayer. In addition, the term "transparent" herein naturally includes a completely transparent state with a transmittance of visible light of 100%, but also includes a state showing a lower transmittance of visible light in accordance with desired action and effect. That is, the resin film used in the present invention is satisfactory when it has a transparency to such a degree that it improves the appearance of the ground stainless steel. The resin film therefore preferably has a transmittance of visible light of 50% or more. Moreover, the resin film may optionally be transparent and colored.

Examples of the synthetic resin material suitable for the resin film include polyurethane resin, acrylic resin, polyester resin, fluoro acrylic resin and polyvinyl chloride resin, although the suitable synthetic resin material is not restricted to those mentioned above. Moreover, in order to improve the properties of the resin film, those resins may contain additives such as an ultraviolet absorber and a coloring agent.

Although the transparent resin film is usually used in a single layer, it may optionally be used in a multi-layer structure of two or more layers. Moreover, an overcoat of polyurethane clear etc. may be formed on the resin film. Although the film thickness of the transparent resin film can be altered in a wide range in accordance with a desired effect or the like, the thickness is usually in a range of about 30 to 1,000 µm, preferably about 50 to 300 µm.

Since the transparent resin film is laminated to the stainless steel substrate, a transparent heat-sensitive adhesive layer is necessary, and the layer is formed on the stainless steel substrate side of the synthetic resin base. Conventionally available transparent heat-sensitive adhesives are suitable for use with the present invention. Examples of the adhesive include polyurethane adhesives, polyester adhesives, olefinic adhesives, acrylic adhesives and vinyl chloride adhesives. The definition of "transparent" explained above is also applied to the transparency of such heat-sensitive adhesives. Although the thickness of the heat-sensitive adhesive layer may be varied in accordance with the adhesive strength required between the stainless steel substrate and the transparent resin film, the thickness is usually about 5 to 500 µm, preferably about 30 to 200 µm.

The heat-sensitive adhesive layer as described above is preferably formed by adjusting the type and film thickness of the adhesive so that the adhesive strength of the transparent resin film acting on the stainless steel substrate becomes 14 N/25 mm or more in terms of peeling strength. The adhesive strength thereof acting on the stainless steel substrate is more preferably 20 N/25 mm or more in terms of peeling strength. When the peeling strength of the resin film from the stainless steel substrate is 14 N/25 mm or more, the article used as an automotive exterior part can be stably used over a long period of time without failure of the adhesive. When the peeling strength lowers 14 N/25 mm, there is a possibility that the resin film peels off due to aging.

For the stainless steel article of the present invention, the transparent resin film is not directly laminated to the stainless steel substrate, but laminated thereto through a silane coupling agent. That is, the use of a silane coupling agent as a primer achieves an excellent bonding condition between the resin film and the stainless steel substrate.

The silane coupling agent used herein as a primer may be basically any type known in silicone chemistry. Accordingly, the silane coupling agent can be represented by the general formula:

$$Y\text{--}SiX_3$$

wherein Y is a reactive organic functional group such as an amino group, an epoxy group, a vinyl group, an (meth) acrylic group and a mercapto group, and X is a hydrolysable group such as an alkoxy group. Accordingly, examples of a suitable silane coupling agent include aminosilane coupling agents, epoxysilane coupling agents, vinylsilane coupling agents and methoxy- (ethoxy-) silane coupling agents, although suitable silane coupling agents to be used are not restricted to those mentioned above.

The entire surface of the stainless steel substrate is usually coated with a silane coupling agent prior to laminating the transparent resin film. The silane coupling agent is dried using conventional particles. The silane coupling agent can be coated by, for example, brush coating, dip coating, spray coating or the like procedure using a solution of the agent. Specifically, for example, the silane coupling agent is dissolved in, for example, alcohol to give a solution containing 1 to 5% of the agent, and the stainless steel substrate is coated therewith by such a coating method as mentioned above. Moreover, the following procedure may also be conducted: a silane coupling agent is impregnated with such a coating solution, and the stainless steel substrate is wiped with the coupling agent to be coated therewith. Although the coating amount of the silane coupling agent during coating can be widely changed depending on a desired treatment effect, the coating amount is usually from about 1 100 mg/m² to 1,000 mg/m², preferably from about 10 100 mg/m² to 100 mg/m². The silane coupling agent subsequent to coating may be subjected to natural drying. However, it is preferred to dry the agent by heating at temperatures of about 40° C. to 20° C. for several seconds to several minutes. Specifically, for example, the stainless steel sheet is placed in an oven with internal air circulation, and it can be dried at about 150° C. for 3 minutes, or at about 200° C. for 2 minutes.

The transparent resin-coated stainless steel article of the present invention may have an additional layer or film for improving the properties and the appearance in addition to the stainless steel substrate and the transparent resin film. For example, in order to improve the design of the article of the present invention, the transparent resin film may also be printed with a pattern, letters or logos, or a printed film may also be laminated to the transparent resin film. Furthermore, the surface of the resin film may also be coated with a transparent clear coating.

In the transparent resin-coated stainless steel article of the present invention, a total thickness of the transparent resin film laminated to a stainless steel substrate, i.e., its thickness including the thickness of the applied silane coupling agent, is preferably in a range of about 35 $\mu$m to 1,500, more preferably about 50 $\mu$m to 500. The thickness below 35 $\mu$m is liable to deteriorate the light fastness and the durability, and the thickness above 1,500 $\mu$m is liable to deteriorate the appearance, along with deterioration of workability.

The transparent resin-coated stainless steel article of the present invention can be produced by various technologies, and there is no specific limitation on the production method. In order to understand better the present invention, one embodiment will be explained. For example, a center pillar as an automotive exterior part can be produced by the following procedure.

A stainless steel sheet having a predetermined size is prepared. Foreign materials etc. sticking to the surface are removed by washing the steel sheet with water, and the steel sheet is degreased with an organic solvent such as methyl ethyl ketone (MEK) or alcohol. The stainless steel sheet having been surface cleaned is entirely coated with a suitable silane coupling agent in the form of a solution. The coating solution of the silane coupling agent is an alcohol solution containing from about 1 to 5% thereof. The silane coupling agent, waste or the like, is impregnated with the coating solution, and the entire surface of the stainless steel sheet is wiped with the coupling agent. In order to bake the coating film of the solution of a silane coupling agent subsequently to coating, the coating film is dried at 200° C. for 2 minutes in an oven with internal air circulation.

When the primer treatment using a silane coupling agent is completed as explained above, a transparent resin film is laminated to the stainless steel sheet (the silane coupling agent-treated surface) through a transparent heat-sensitive adhesive layer. For example, a composite film comprising a transparent urethane film and a transparent urethane heat-sensitive adhesive layer can be used as the transparent resin film.

When laminating the resin film to the stainless steel sheet is completed, the stainless steel sheet held by a jig is press formed. A center pillar having a desired shape can thus be obtained without involving peeling and break of the resin film laminated to the stainless steel sheet. Since the bonded surface between the center pillar and the resin film thereon is excellent in water resistance, light resistance, etc., the properties required of an automotive exterior part can be sufficiently satisfied. Moreover, even when the center pillar is exposed to harsh conditions over a long period of time, no inconvenience such as peeling of the resin film occurs. Furthermore, since application of the silane coupling agent can be conducted by a procedure similar to that of applying a conventional acrylic primer, the advantage of mass-productivity brought by the use of the film is not lost. Still furthermore, since forming an article having a desired shape can be conducted after finishing a series of treatments including lamination of the resin film, the number of the steps can be reduced in the production of the articles. Thus the yield of the articles can be increased in comparison with the conventional procedure comprising coating steel substrates with a resin after forming articles. Furthermore, since the resin film with which the stainless steel sheet is coated is transparent, manifestation of such properties of the stainless steel ground as luster and metallic appearance is not impaired.

It will be understood from what is explained above that the transparent resin-coated stainless steel articles of the present invention can be advantageously used for the production of various stainless steel articles. Moreover, since the resin-coated stainless steel articles are particularly excellent in water resistance, light resistance, or the like, they can be especially advantageously used as automotive exterior parts. Examples of the automotive exterior parts include grilles, trims, garnishes of door mirror and the like, in addition to the moldings and pillars described above.

EXAMPLES

The present invention will be subsequently explained in detail by making reference to examples. In addition, it should be understood that the present invention is in no way restricted to the following examples.

Examples 1 to 6

Different silane coupling agents described below were used in respective examples to produce transparent resin-coated stainless steel articles of the present invention as samples.

| Example | Silane coupling agent | Trade name (manufacturer) |
|---|---|---|
| 1 | Aminosilane coupling agent | AP-133 (Nippon Unicar Company Limited) |
| 2 | Mercaptosilane coupling agent | APZ-730 (Nippon Unicar Company Limited) |
| 3 | Aminopropyltriethoxysilane | A-1100 (Nippon Unicar Company Limited) |
| 4 | Glycidoxypropyltrimethoxysilane | A-187 (Nippon Unicar Company Limited) |
| 5 | Glycidoxypropyltrimethoxysilane | Sila-Ace S 510 (Tisso Corporation) |
| 6 | Glycidoxypropyltrimethoxysilane + acrylsilicone | Primer SCP 5 (Tisso Corporation) |

First, a stainless steel sheet (Product name: SUS 430BA, manufactured by Nisshin Seijou Co.) having a 150 mm long, 35 mm wide and 0.5 mm thick was prepared. The surface was decreased with methyl ethyl ketone (MEK). A silane coupling agent was then impregnated with an ethanol solution containing 5% of a silane coupling agent, and the surface of the stainless steel sheet was wiped with the silane coupling agent. The stainless steel sheet was placed in an oven with internal air circulation at 200° C., and dried for 2 minutes.

When the primer treatment with the silane coupling agent was completed, a transparent composite film was laminated to the stainless steel sheet while the treated surface was still at 200° C. The composite film used herein was prepared by coating one side of a transparent polyurethane film (two solution type) 60 $\mu$m thick with a polyurethane heat-sensitive adhesive (trade name of Desmocoll 530, manufactured by Bayer) at a thickness of 25 μm. In order to firmly bond the composite film to the stainless steel sheet, the film was laminated to the steel sheet while the film was being pressed with a jig.

The stainless steel sheet having the composite film was subsequently press formed to give a sample. No peeling of the composite film was observed in the course of press forming of the sample.

Evaluation Test

The appearance and adhesive strength of the composite films of the samples prepared in respective Examples 1 to 6 were evaluated under different conditions (after application of warm water and after accelerated weathering test). The procedure of evaluating an adhesive strength under each condition is shown below.

1. After Application of Warm Water

In the test, how the appearance of a composite film varies when warm water is applied is evaluated along with water resistance of the adhesive strength of the film. A sample is immersed in warm water at 40° C. for 240 hours, taken out of the warm water bath, and allowed to stand for one hour. The composite film is peeled off the stainless steel sheet with hands, and the peelable degree of the composite film is evaluated at the following three levels:

γ . . . difficult to peel (adhesive strength clearly satisfying the standard for automotive exterior films);

Δ . . . easily peelable (adhesive strength clearly not satisfying the standard for automotive exterior films); and × . . . unbonded and easily peelable.

In addition, when an extraordinary appearance is observed, the observation is noted.

2. After Accelerated Weathering Test

In the test, how the adhesive strength of a composite film varies when the film is irradiated with outdoor light, namely, the light resistance (weathering resistance) of the adhesive strength is evaluated. A sample is attached to an accelerated weathering testing machine (sunshine carbon weatherometer), exposed to severe light irradiation, and taken out of the testing machine. The sample is allowed to stand for one hour, and the peelable degree of the composite film is evaluated at three levels by the same procedure as mentioned above.

Evaluation results as described in Table 1 were obtained.

TABLE 1

| Example | Adhesive strength (water resistance) | Adhesive strength (light resistance) |
| --- | --- | --- |
| 1 | γ | γ |
| 2 | γ | γ |
| 3 | γ | γ |
| 4 | γ | γ |
| 5 | γ | γ |
| 6 | γ | γ |

It is understood from the evaluation results in Table 1 that satisfactory adhesion strength sufficient to satisfy the requirements of the standard for automotive exterior films with regard to the water resistance and light resistance could be obtained in Examples 1 to 6.

Comparative Examples 1 to 6

The procedures described in Examples 1 to 6 were repeated. However, in the present comparative examples, the following procedures were employed for comparison in place of the primer treatments using silane coupling agents. That is, a primer treatment was omitted, or primer treatments were conducted with different finishing agents as, described below. In addition, each finishing agent was usually commercially available as an adhesive.

| Comp. Example | Finishing agent | Trade name (manufacturer) |
| --- | --- | --- |
| 1 | No (stainless steel sheet) | |
| 2 | Acrylic finishing agent | Hamatight Y 1104B (Yokohama Rubber Co., Ltd.) |
| 3 | Acrylic/modified phenolic finishing agent | KBS 17 (KONISHI CO., LTD.) |
| 4 | Sodium hydroxide, KBS 17 | |
| 5 | Polyester/polyisocyanate finishing agent | Y 6171 (KONISHI CO., LTD.) |
| 6 | Aqueous acrylic finishing agent | JA 7454 (Sumitomo 3M Ltd.) |
| 7 | Polyamide finishing agent | PROMOTOR 86 (Sumitomo 3M Ltd.) |
| 8 | Phenol/polyvinyl butyrate finishing agent | JA 7413R (Sumitomo 3M Ltd.) |

In the table described above, Comparative Example 1 is an instance in which a sample was prepared without surface treatment of the stainless steel sheet. Comparative Examples 2, 3, 5 to 8 correspond to Examples 1 to 6, respectively. Although Comparative Example 4 corresponds to Example 3, the stainless steel sheet surface was first wiped to coat the sheet surface with an aqueous solution containing 5% of sodium hydroxide, dried, and surface treated with KBS 17.

Evaluation results as described in Table 2 were obtained.

TABLE 2

| Comp. Example | Adhesive strength (water resistance) | Adhesive strength (light resistance) | |
| --- | --- | --- | --- |
| 1 | × | γ | |
| 2 | γ | × | 80 hr |
| 3 | γ | × | 80 hr |
| 4 | | × | 30 hr |
| 5 | | Δ | 1200 hr |
| 6 | | × | 80 hr |
| 7 | | Δ | 1200 hr |
| 8 | | × | 80 hr |

Note:
Hr (time) in the column of Adhesive strength (light resistance) designates an elapsed time until the occurrence of inconvenience (peeling of film).

It is understood from the evaluation results in Table 2 that no adhesion strength sufficient to satisfy the requirements of the standard for automotive exterior films with regard to the water resistance and light resistance could be obtained, if the film-coated stainless steel sheet is produced without applying a silane coupling agent to a surface of the sheet to be coated.

Example 7

Twenty-three types of samples in total were prepared, and the adhesive strength (N/25 mm) of each sample was measured.

First, two types of stainless steel sheets (SUS 430BA and SUS 304BA, both manufactured by Nisshin Seikou Co.) having a 150 mm long, 35 mm wide and 0.5 mm thick were prepared. The surface of each sheet was degreased with methyl ethyl ketone (MEK).

Each sheet was subsequently wiped with a wiping cloth impregnated with an ethanol solution containing 5% of a silane coupling agent used in Examples 1 to 6 or a finishing agent used in Comparative Examples 2 to 8, as shown in Table 3. The coating amount of each coupling agent was from about 0.02 to 0.05 g/m$^2$ in terms of dried weight. The coating amount of each finishing agent was from about 2 to 5 g/m² in terms of dried weight. As shown in Table 3, such primer treatment was omitted for samples 3, 14 and 21. The stainless steel sheets were placed in an oven with internal air circulation at 200° C., and dried for 2 minutes.

When the primer treatment with a silane coupling agent or finishing agent was completed, one of the following three types of transparent composite films was laminated to the stainless steel sheet. The composite films used herein each have a two-layer structure, and the layer structures are as described below.

Composite Film 1:
  Base: two solution type transparent polyurethane film (60 μm thick)
  Adhesive layer: polyurethane heat-sensitive adhesive (trade name of Desmocoll 530, manufactured by Bayer, 25 μm thick)

Composite Film 2:
  Base: two solution type transparent polyurethane film (60 μm thick)
  Adhesive layer: polyester heat-sensitive adhesive (trade name of Elitel UE 3500, manufactured by Unitika Corporation, 25 μm thick)

Composite Film 3
  Base: two solution type transparent polyurethane film (60 μm thick)
  Adhesive layer: acrylic transparent pressure-sensitive adhesive (trade name of SK Dyne 1502, manufactured by Soken Kagaku K. K., 25 μm thick)

Composite Film 4:
  Base: two solution type transparent polyurethane film (black, 60 μm thick)
  Adhesive layer: polyurethane heat-sensitive adhesive (trade name of Desmocoll 530, manufactured by Bayer, 25 μm thick)

For a composite film 3 in which a pressure-sensitive adhesive was used, the film was laminated to a stainless steel substrate while the film was being pressed with a jig. Moreover, for a composite film 1 or 2 in which a heat-sensitive adhesive was used, the composite film was laminated to a stainless steel sheet having been subjected to primer treatment and having temperature as high as 200° C.

Measurement of Adhesive Strength

The adhesive strength of the sample (hereinafter termed "specimen") prepared as explained above was measured under different conditions (normal state, after application of warm water and after accelerated weathering test). The methods of measuring adhesive strength under respective conditions will be described below.

1. Normal State

In the test, the adhesive strength of a specimen is measured as a peeling strength (N/25 mm) obtained by a 180° peeling test of the specimen 48 hours after preparing the specimen. In accordance with JIS Z 6800, after attaching the specimen to a 180° peeling testing machine, a portion of the composite film 25 mm wide is removed by cutting, and the load is measured at the time when one end of the test piece is peeled off in the 180° direction. Measurement results as described in Table 3 were obtained.

Numerical values and abbreviations described in Table 3 are illustrated below.
  Numerical value: peeling strength (N/25 mm)
  F: lifting of the composite film during peeling test
  C: cutting of the composite film during peeling test (the peeling strength also being recorded)
  NP: no peeling of the composite film during peeling test (the adhesive strength being very high)

2. After Application of Warm Water

In the test, how the adhesive strength of a specimen varies when warm water is applied, namely, the water resistance of the adhesive strength is evaluated. The specimen is immersed in warm water at 40° C. for 240 hours, taken out of the warm water bath, and allowed to stand for one hour. The peeling strength (N/25 mm) of the specimen is then measured as the adhesive strength by a 180° peeling test. The method and condition of measurement are the same as explained above. Measurement results as described in Table 3 were obtained.

3. After Accelerated Weathering Test

In the test, how the adhesive strength of a specimen varies when the specimen is irradiated with outdoor light, namely, the light resistance (weathering resistance) of the adhesive strength is evaluated. The specimen is attached to an accelerated weathering testing machine (sunshine carbon weatherometer), exposed to severe light irradiation for 2,000 hours, and taken out of the testing machine. The specimen is allowed to stand for one hour, and the peeling strength (N/25 mm) is measured as the adhesive strength by a 180° peeling test. The method and condition of measurement is the same as explained above. The measurement results thus obtained are shown in Table 3.

TABLE 3

| Specimen No. | Type of SUS | Film | Primer treatment | Adhesive Strength (N/25 mm) | | |
|---|---|---|---|---|---|---|
| | | | | Normal state | Water res* | Light res* |
| 1 | 430 BA | 4 | KBS 17 | NP | 69 C. | NP |
| 2 | 430 BA | 1 | KBS 17 | NP | 62 C. | 1 |
| 3 | 430 BA | 1 | — | 55 | F | 29 |
| 4 | 430 BA | 1 | AP 133 | NP | 56 C. | 45 C. |
| 5 | 430 BA | 1 | APZ 730 | NP | NP | 40 C. |
| 6 | 430 BA | 1 | A 1100 | NP | NP | 40 C. |
| 7 | 430 BA | 1 | A 187 | NP | 78 C. | 35 C. |
| 8 | 430 BA | 1 | Sila-Ace S 510 | NP | 76 C. | 46 C. |
| 9 | 430 BA | 1 | Y 1104B | NP | NP | F |
| 10 | 430 BA | 1 | Y 6171 | NP | 8 | 6 |
| 11 | 430 BA | 1 | JA 7454 | NP | 11 | 2 |
| 12 | 430 BA | 1 | PROMOTER 86 | NP | 4 | 6 |
| 13 | 430 BA | 2 | KBS 17 | 56 C. | 38 | F |
| 14 | 430 BA | 2 | — | 25 | 1 | 27 |
| 15 | 430 BA | 2 | AP 133 | 51 | 38 | 55 C. |
| 16 | 430 BA | 2 | A 1100 | 51 C. | 44 C. | 39 C. |
| 17 | 430 BA | 3 | AP 133 | 41 | 34 | 25 |
| 18 | 430 BA | 3 | A 1100 | 40 | 33 | 27 |
| 19 | 304 BA | 4 | KBS 17 | NP | 55 C. | 50 C. |
| 20 | 304 BA | 1 | KBS 17 | 70 C. | 42 | F |
| 21 | 304 BA | 1 | — | 73 C. | 1 | 43 C. |
| 22 | 304 BA | 1 | AP 133 | 65 | 35 | 38 |
| 23 | 304 BA | 1 | A 1100 | 53 C. | 37 | 40 |

Note:
res* = resistance

It is understood from the measurement results described in Table 3 that effective adhesion strength could be obtained only when a silane coupling agent was applied to a surface of the stainless steel sheet to be coated with a film. Further, effective adhesion strength could be obtained when the stainless steel sheet was changed or an adhesive layer of the film was changed.

Example 8

In the present example, how the adhesive strength (N/25 mm) of a sample varies when the coating amount of a silane coupling agent is changed was evaluated.

Specimen 4 (aminosilane coupling agent AP-133 being used) and specimen 6 (aminopropyltriethoxysilane A-1100 being used) in Example 7 were used, and the procedures described in Example 7 were repeated. The coating amounts of AP-133 or A-1100 were then changed to 10, 1, 0.1, 0.01, 0.001 or 0.0001 g/m² as described in Table 4. Measurement results as described in Table 4 were obtained.

TABLE 4

| Specimen No. | Silane coupling agent | | Adhesive strength (N/25 mm) | | |
| --- | --- | --- | --- | --- | --- |
| | Type | Coating amount (g/m$^2$) | Normal | Water res* | Light res* |
| 4A | AP 133 | 10 | 69 C. | 1 | 22 |
| 4B | AP 133 | 1 | NP | 16 | 35 |
| 4C | AP 133 | 0.1 | 37 C. | 44 C. | 53 |
| 4D | AP 133 | 0.01 | 42 C. | 62 C. | 50 |
| 4E | AP 133 | 0.001 | 51 C. | 22 | 43 |
| 4F | AP 133 | 0.0001 | 49 C. | 1 | 30 |
| 6A | A 1100 | 10 | 73 C. | 1 | 33 |
| 6B | A 1100 | 1 | 41 C. | 22 | 44 |
| 6C | A 1100 | 0.1 | NP | 35 | 40 |
| 6D | A 1100 | 0.01 | 72 C. | 38 | 35 |
| 6E | A 1100 | 0.001 | 68 C. | 19 | 36 |
| 6F | AP 133 | 0.0001 | 51 C. | 2 | 29 |

Note:
res* = resistance

It is understood from the measurement results in Table 4 that a coating amount of the silane coupling agent is effective in the range of 1 to 1,000 mg/m$^2$, preferably in the range of 10 to 100 mg/m$^2$.

EFFECT OF INVENTION

As explained above, the present invention provides a stainless steel article which has a transparent and uniform resin coating thereon, which can utilize the surface appearance of the stainless steel used as a substrate, which shows a high adhesive strength between the resin coating and stainless steel as a ground, which can be easily produced with a small number of steps, and which is particularly useful as an automotive exterior article.

What is claimed is:

1. A resin-coated stainless steel article, comprising a stainless steel substrate and a transparent resin film with which at least one surface of the substrate is coated, the transparent resin film comprising a transparent polyurethane base and a transparent heat-sensitive adhesive layer fanned on the transparent polyurethane base on the side of the stainless steel substrate, and the transparent resin film being bonded to the stainless steel substrate through a silane coupling agent.

2. The resin-coated stainless steel article according to claim 1, wherein the entire surface of the stainless steel substrate is coated with the silane coupling agent in a coating amount of 1 mg/m$^2$ to 1,000mg/m$^2$.

3. The resin-coated stainless steel article according to claim 1, wherein the adhesive strength of the resin film with the stainless steel substrate is at least 14 N/25 mm in terms of peeling strength.

4. The resin-coated stainless steel article according to claim 1, wherein the transparent heat-sensitive adhesive is a polyurethane adhesive, a polyester adhesive, an olefinic adhesive, an acrylic adhesive or a vinyl chloride adhesive.

5. The resin-coated stainless steel article according to claim 1, wherein the resin-coated stainless steel article is applied to an automotive exterior.

6. The resin-coated article according to claim 1, wherein the synthetic resin base and the heat-sensitive adhesive layer are transparent.

7. A method of forming a resin-coated stainless steel article, comprising applying a transparent resin film comprising a transparent polyurethane base and a transparent heat-sensitive adhesive layer to a stainless steel substrate, wherein said transparent resin film is bonded to a surface of said stainless steel substrate through a silane coupling agent.

* * * * *

UNITED STATES PATENT AND TRADEMARK OFFICE
CERTIFICATE OF CORRECTION

PATENT NO. : 6,890,658 B2
DATED : May 10, 2005
INVENTOR(S) : Egashira, Ken

It is certified that error appears in the above-identified patent and that said Letters Patent is hereby corrected as shown below:

Column 2,
Line 27, after "if" delete ".".

Column 6,
Line 53, delete "Seijou" and insert -- Seikou --.
Line 55, delete "decreased" and insert -- degreased --.

Column 7,
Line 67, after "as" delete ",".

Column 11,
Line 39, delete "fanned" and insert -- formed --.

Column 12,
Line 22, delete "1,000mg/m$_2$" and insert -- 1,000 mg/m$_2$ --.

Signed and Sealed this

Twenty-fourth Day of January, 2006

JON W. DUDAS
*Director of the United States Patent and Trademark Office*